United States Patent Office 3,795,525
Patented Mar. 5, 1974

3,795,525
ALUMINUM-ASBESTOS COATING COMPOSITIONS
Earl F. Carlston, El Cerrito, Calif., assignor to Chevron Research Company, San Francisco, Calif.
No Drawing. Continuation-in-part of abandoned application Ser. No. 60,121, July 31, 1970. This application Mar. 23, 1972, Ser. No. 237,556
The portion of the term of the patent subsequent to May 12, 1987, has been disclaimed
Int. Cl. C08h 15/02; C09d 3/24
U.S. Cl. 106—123                                                7 Claims

ABSTRACT OF THE DISCLOSURE

An aluminum-containing weather-resistant non-bituminous coating composition which comprises aluminum pigment, a high molecular weight viscous oil, a hydrocarbon solvent or thinner, asbestos fibers, ground mica, a polyurea material effective as an additive which prevents settling out of fillers and enhances the color of the finished coating and optionally a color pigment.

CROSS-REFERENCE TO RELATED APPLICATION

This application is a continuation-in-part of U.S. application Ser. No. 60,121, filed July 31, 1970, now abandoned.

BACKGROUND OF THE INVENTION

Field of the invention

The present invention relates to filled aluminum-asbestos non-bituminous coating compositions or paints, whose properties have been significantly improved by the addition of certain polyurea materials which reduce the tendency of fillers and color pigments to settle out, and brighten the coloring of the finished coated surface.

The compositions of this invention have the desirable properties of the prior art aluminum-bituminous compositions but without the concomitant undesirable properties.

Description of the prior art

Aluminum-bituminous paints have attained considerable popularity because the coatings applied therewith last a long time, resist weathering and display a bright metallic surface. Such coating compositions or paints are disclosed, for instance, by Buchanan in U.S. Pat. No. 2,477,236. Incorporation of color pigments other than aluminum powder or flake, when the shiny metallic surface is not desired, has also been proposed.

A drawback frequently encountered in colored aluminum-containing filled bituminous coatings or paints consists, in that, owing to their "cutback" character, color pigments, aluminum flake and the various fillers tend to settle out in the container, while aluminum flakes rise to the surface of the paint and also agglomerate in spots on the coated surface after the application of the paint. The lower the viscosity of the coating or paint, the greater is the tendency of the fillers and pigments to settle out. This is what happens if the colored bituminous paint is "cut back" with additional organic solvent or diluent to reduce the intensity of the black color of the bituminous component.

At the same time, introduction of effective amounts of mineral fillers (up to 30 percent by weight of the entire coating composition) is desirable because as pointed out, for instance, in U.S. Pat. No. 2,923,639, issued to Wilkinson, fillers provide for a greater shatter strength of the coating, higher fire-resistance, and lesser susceptibility to slippage. Moreover, the fillers enhance weatherability, increase resistance to abrasion and impart better vapor-barrier properties (see Dickson, Industrial and Engineering Chemistry, April 1966, p. 26). Thus, in the case of aluminum pigment or flakes, the higher the content of aluminum in the paint, the better the resistance of the finished coating to weathering. Among the many fillers, ground mica is known to increase fire resistance and durability of the coatings, while asbestos fibers are employed to prevent slippage of coatings from metal surfaces, particularly when temperatures higher than 140° F. are met within industrial installations or buildings.

It is thus apparent that formulators were faced heretofore with a difficult problem of discovering such a coating composition or paint as would embody the characteristics of an effective bituminous cutback binder, such as an asphalt or the like, filled with mica and asbestos and containing, in addition, aluminum flake and a color pigment, without being subject to an undesirable settling out of such filters and pigments, and without displaying excessively a metallic sheen of aluminum on the surface of a laid coating and/or a dark, dulled appearance of a finished coating due to the dark color of the bituminous base binder.

One commercial solution to this problem was the use of a coating having the following composition:

(1) 9.5 percent by weight of Petrolastic 185 asphalt.
(2) 9.5 percent by weight of Zerolene 9 Extract (a lubricating oil extract from a California naphthenic crude).
(3) 27.6 percent by weight of a volatile hydrocarbon thinner.
(4) 2.5 percent by weight of a mixture of:
  (a) 15 percent by weight of tall oil fatty amine,
  (b) 15 percent by weight of dodecylaniline, and
  (c) 70 percent by weight of the thinner described above.
(5) 2.5 percent by weight of a mixture of 10 percent by weight of tolylene diisocyanate and 90 percent by weight of the thinner described above.
(6) 9.0 percent by weight of asbestos fibers.
(7) 18.0 percent by weight of mica powder.
(8) 4.3 percent by weight of a colored pigment paste.
(9) 13.7 percent by weight of aluminum paste. (65 percent by weight of aluminum pigment)

U.S. Pat. No. 3,511,675 (which discloses compositions very close to that above) should also be noted. The invention and disclosure set forth therein is closely related to the subject invention and the disclosure therein is hereby incorporated by reference.

SUMMARY OF THE INVENTION

It has now been found that a non-bituminous aluminum-asbestos composition can be obtained which provides good weatherability and strength to a coating laid therewith. A pleasant coloration can be obtained, if desired, free from excessive luster or sheen of the aluminum pigment. This newly found composition is not subject to the drawback of random settling out of pigments and fillers and the prior art's bituminous material has been completely replaced by a high molecular weight viscous oil which reduces bleed-through of dark coloration. Further, less aluminum pigment is required, due to the absence of the black bituminous material.

The aforementioned desirable non-settling characteristics of the aluminum-asbestos compositions of the present invention are due to the presence therein of added polyurea materials produced by reacting diisocyanates with monoamines or mixtures of monoamines and diamines. These polyureas have at least 2 urea groups in their molecular structure and are terminated by hydrocarbon end members (hydrocarbyl radicals). They are prepared in a known manner, reacting a diisocyanate with an amine or a mixture of amines at temperatures which may vary from about 70° to about 200° F., resorting to external heating or cooling, as it may be necessary. These polyureas can be represented by a general formula:

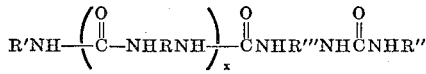

in which R' and R'' may be the same or different hydrocarbyl radicals of 1 to 30 carbon atoms, R and R''' may be the same or different hydrocarbylene radicals of 2 to 30 carbon atoms, and $x$ may be a number from 0 to 8. Broadly speaking, any polyurea material having at least 2 urea units —HNC(O)NH— and hydrocarbon terminal end members thereon, when it is soluble in a known, conventionally used hydrocarbon solvent, would be operative in the formulations of the present invention.

Because of the considerations of solubility in commonly used commercial hydrocarbon solvents, the relative cost and availability of different hydrocarbon solvents for polyureas as their molecular weight increases, and the cost of manufacturing higher polyureas (or rather mixtures thereof), polyurea products (or mixtures) having from at least 2 to as high as 6 urea units, are preferred as additives effective in preventing settlement or pigments and fillers and enhancing the color of the coating formulations of the present invention. In other words, the subscript "$x$" in the general formula given hereinabove is preferably a number from 0 to 4.

As examples of operative polyurea additives, there may be mentioned: the diurea material produced by reacting 1 mole of tolylene diisocyanate with 2 moles of tall oil fatty monoamine, another diurea material produced by reacting the same diisocyanate (1 mole) with 2 moles of a mixture of tall oil fatty monoamine with p-dodecyl aniline (mole ratio of the fatty monoamine to the aniline being 1:1), and the like diureas and higher polyureas.

The preparation of these polyureas, the proportions of the reactants for this preparation and the corresponding reaction conditions have been described in the art, for instance, in U.S. Pat. No. 3,015,625, issued to Rosscup and Liehe, and U.S. Pat. No. 3,243,372, issued to Dreher and Goodrich, which are both incorporated herein by reference. The terminal groups of the polyureas described in the last named patent are hydrocarbylene of from 1 to 30 carbon atoms, and the interior groups are from 2 to 30 carbon atoms.

The essential components of the improved colored aluminum-asbestos composition of the invention are (all parts by weight):

(1) a high molecular weight viscous oil as described hereinafter in an amount of from about 15 to about 25 percent, preferably from 16 to 23 percent;

(2) a volatile hydrocarbon solvent or thinner for the viscous oil in amounts which may be varied from about 25 to about 35 percent, boiling from about 250° to about 450° F. (ASTM D-86) and bringing the consistency of the final composition to a workable level when being applied as a surface coating or roofing or wall paint;

(3) from about 1 to about 10 percent of aluminum pigment, (used as a paste of known commercial type);

(4) from about 20 to about 40 percent of ground mica as a filler for enhancing fire resistance and durability of the finished coatings;

(5) from about 5 to about 15 percent of fine asbestos fibers, the presence of which improves weatherability and prevents sliding off (slippage) of the coating from metal surfaces when the temperature rises above about 140° F.;

(6) from 0 to about 5 percent of a color pigment, the exact amounts within the above range depending on the desired intensity of a particular color (none being used if the aluminum sheen is desired);

(7) from about 0.5 to about 5 percent of the polyurea-additive prepared as described hereinabove, which reduces the leafing tendency of the aluminum pigment or flakes, prevents the settling out of fillers and pigments, and contributes to the establishment of an improved strong coating (which optionally can have a pleasant pastel-like color), without being accompanied by the drawbacks formerly experienced with similar aluminum-bituminous type coatings.

DESCRIPTION OF PREFERRED EMBODIMENTS

In formulating the compositions of the present invention, it is preferred to first combine the high molecular weight lubricating oil extract from conventional refinery solvent treatment of petroleum base stocks with the thinner which typically is a light hydrocarbon distillate, such as a crude solvent naphtha commonly available in the trade, predominantly naphthenic, petroleum thinner boiling between 310° and 450° F. As an example of a suitable high molecular weight lubricating oil extracts, an extract from a California naphthenic crude, known in the industry under the designation of "Zerolene 9 Extract" ("Zerolene" being a trademark for the corresponding lubricating oil), lends itself readily for the purpose. Zerolene 9 Extract has a straight aniline point of 100° F. and a viscosity at 100° F. of about 12,000 centipoise. Other viscous oils are also satisfactory. Their viscosity should be in the range of 10,000 to 80,000 centipoise at 100° F. The lubricating oil extracts suitable for this invention are characterized by an aniline point in the range of 80° F. straight to 120° F. mixed, low wax content and a viscosity index in the range from about −100 to about −500. These extracts are obtainable by solvent extraction of lubricating oil distillates, for instance, by extraction with phenol, furfural, etc. They are predominantly aromatic and naphthenic in nature, because they are derived from that portion of lubricating oil distillates which has the lowest viscosity index. Usually, the pour point of these extracts is less than 15° F.

The polyurea additive is next incorporated into the mix. Then the fillers (mica and asbestos) are added and thoroughly distributed in the resulting dilution, followed by the addition of aluminum flake (as a paste) and of the color pigment, if desired. The final composition is then cooled down to room temperature and, if desired, thinned out further with a volatile hydrocarbon thinner to attain the final desired workable consistency.

The coatings are applied in any suitable manner either by brush, roller, or by spraying or other known paint application techniques.

As an illustration of the invention and not by way of limitation, the following examples are offered:

EXAMPLE 1

Into a vessel was pumped 21.5 parts by weight of Zerolene 9 Extract (previously described) and 27 parts by weight of a petroleum thinner boiling between 300° and 400° F.

2.5 parts by weight of a mixture of 30 percent by weight of a 1:1 mix of tall oil fatty amine and p-dodecylaniline and 70 percent by weight of a petroleum thinner boiling between 300° and 400° F. were placed in a mixing tank. 2.5 parts by weight of a mixture of 10 percent by weight tolylenediisocyanate and 90 percent by weight of a petroleum thinner boiling between 300° and 400° F. was then added to the mixing tank with stirring and the contents of the tank were then added to the vessel containing the Zerolene 9 Extract and thinner.

11.5 parts by weight of asbestos fibers and 25.5 parts by weight of 200 mesh mica powder was then added to the vessel with mixing followed by 9.5 parts by weight of Alcan E-8400 (an aluminum paste, product of the Alcan Aluminum Company, containing about 75 percent aluminum pigment).

The well-mixed aluminum-asbestos coating composition was then (1) brushed and (2) rolled on an exposed roof.

After 4 hours, the coated surface was examined and found to have a bright, uniform aluminum appearance.

After 6 months of exposure, the coated surface was found to be bright with no dulling, cracking or checking. No dark streaks due to overlap and bleed-through of dark-colored material were present.

EXAMPLE 2

Into a vessel was pumped 16.6 parts by weight of Zerolene 9 Extract (previously described) and 27.7 parts by weight of a petroleum thinner boiling between 300° and 400° F.

2.5 parts by weight of a mixture of 30 percent by weight of a 1:1 mix of tall oil fatty amine and p-dodecylaniline and 70 percent by weight of a petroleum thinner boiling between 300° and 400° F. were placed in a mixing tank. 2.5 parts by weight of a mixture of 10 percent by weight tolylenediisocyanate and 90 percent by weight of a petroleum thinner boiling between 300° and 400° F. was then added to the mixing tank with stirring and the contents of the tank were then added to the vessel containing the Zerolene 9 Extract and thinner.

80 parts by weight of asbestos fibers and 36.5 parts of 200 mesh mica powder, followed by 2.2 parts of red iron oxide (Kroma Red, Chas. Pfizer Co.), and 3.0 parts of Alcoa 6221 (an aluminum paste, product of Aluminum Company of America, containing about 65 percent aluminum pigment).

The well-mixed aluminum-asbestos coating composition was then (1) brushed and (2) rolled on an exposed roof. After 4 hours, the coated surface was examined and found to have a bright uniform red color.

After 6 months of exposure, the coated surface was found to be bright with no dulling, cracking or checking. No dark streaks due to overlap and bleed-through of dark-colored material were present.

In all instances, where compositions contain the polyurea, the coatings are surprisingly uniform, and show no settling of fillers.

By contrast, coatings produced with a formulation which contains no polyurea exhibit considerable settling of the pigments and fillers.

While the aforegiven examples of the improved coating compositions of the invention have been carried out by employing a polyurea produced by reacting tolylene diisocyanate with tall oil fatty monoamine and p-dodecyl aniline, the disclosure is by no means limited to these specific reactants for producing polyureas operative in accordance with the invention.

Other monoamines and diamines, when reacted with different diisocyanates, such as phenylene diisocyanate and the like, in the proportions and under the reaction conditions disclosed in the previously mentioned U.S. Pat. No. 3,243,372, issued to Dreher and Goodrich, may be used successfully to produce polyureas operative in the coating compositions formulated in accordance with the present invention.

It is apparent that different embodiments of the invention may be made without departing from the scope and spirit thereof; and therefore, it is not intended to be limited except as indicated in the appended claims.

I claim:

1. A non-bituminous coating composition comprising of:
   (1) from about 15 to about 25 parts by weight of a viscous oil having a viscosity in the range of from 10,000-80,000 centipoise at 100° F. and an aniline point in the range of 80° F. straight to 120° F. mixed;
   (2) from about 25 to about 35 parts by weight of a liquid hydrocarbon thinner which boils in the range from about 300 to about 450° F. (ASTM D-86);
   (3) from about 5 to about 15 parts by weight of fine asbestos fibers;
   (4) from about 20 to about 40 parts of powdered mica;
   (5) from about 1 to about 10 parts by weight of aluminum pigment;
   (6) from 0 to about 5 parts by weight of a color pigment; and
   (7) from about 0.5 to about 5 parts by weight of a polyurea having the general formula:

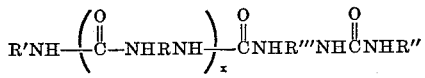

in which R' and R'' are the same or different hydrocarbyl radicals of 1 to 30 carbon atoms, R and R''' are the same or different hydrocarbylene radicals of 2 to 30 carbon atoms, and $x$ is a number from 0 to 8 with the proviso that total parts by weight of said seven components set forth above equal 100.

2. Claim 1, wherein said high molecular weight viscous oil has a viscosity of about 12,000 centipoise and a straight aniline point of about 100° F.

3. Claim 1, wherein radicals R and R''' in the general formula of the polyurea are tolylenes.

4. Claim 1, wherein said polyurea is a diurea product of reaction of tall oil fatty monoamine and tolylene diisocyanate.

5. Claim 1, wherein said polyurea is a diurea product of reaction of tolylene diisocyanate and a mixture of tall oil fatty monoamine and p-dodecyl aniline in a mole ratio of 1:1.

6. Claim 5, wherein said oil is present in an amount of from 18 to 23 parts by weight.

7. Claim 6, wherein:
   (1) said oil is present in an amount of from 21.5 parts by weight;
   (2) said thinner is present in an amount of about 31 parts by weight;
   (3) said asbestos fibers are present in an amount of about 11.5 parts by weight;
   (4) said mica is present in an amount of about 25.5 parts by weight;
   (5) said flake aluminum is present in an amount of about 9.5 parts by weight;
   (6) said polyurea is present in an amount of about 1 part by weight; and
   (7) said color pigment is present in an amount of zero parts by weight.

References Cited

UNITED STATES PATENTS 3,511,675   5/1970   Carlston _____ 106—280

OTHER REFERENCES

Asphalts & Allied Substances, Abraham, H., 6th ed. 1963, pp. 52, 53.

THEODORE MORRIS, Primary Examiner

U.S. Cl. X.R.

106—280